United States Patent
Chandrashekar et al.

(10) Patent No.: US 8,612,579 B2
(45) Date of Patent: *Dec. 17, 2013

(54) METHOD AND SYSTEM FOR DETECTING AND REDUCING BOTNET ACTIVITY

(75) Inventors: Jaideep Chandrashekar, Palo Alto, CA (US); Eve M. Schooler, Portola Valley, CA (US); Nina Taft, San Francisco, CA (US); Frederic Giroire, Paris (FR)

(73) Assignee: Intel Corporation, Santa Clara, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/094,125

(22) Filed: Apr. 26, 2011

(65) Prior Publication Data

US 2011/0202997 A1 Aug. 18, 2011

Related U.S. Application Data (63) Continuation of application No. 12/347,169, filed on Dec. 31, 2008, now Pat. No. 7,953,852.

(51) Int. Cl.
*G06F 15/16* (2006.01)

(52) U.S. Cl.
USPC ........... 709/224; 709/222; 709/219; 709/221; 709/225; 709/223; 370/392; 370/389; 370/230; 345/63; 345/60; 345/72

(58) Field of Classification Search
USPC ......... 709/224, 223, 229, 235, 238, 245, 222, 709/221
See application file for complete search history.

(56) References Cited

U.S. PATENT DOCUMENTS

| | | | |
|---|---|---|---|
| 7,620,693 B1 * | 11/2009 | Mott et al. | 709/213 |
| 7,953,852 B2 * | 5/2011 | Chandrashekar et al. | 709/224 |
| 8,195,750 B1 * | 6/2012 | Bakhmutov | 709/206 |
| 8,468,601 B1 * | 6/2013 | Bakhmutov | 726/23 |
| 2006/0029104 A1 * | 2/2006 | Jungck | 370/498 |
| 2006/0075347 A1 * | 4/2006 | Rehm | 715/727 |
| 2008/0080518 A1 | 4/2008 | Hoeflin et al. | |
| 2008/0307526 A1 | 12/2008 | Chung et al. | |
| 2009/0037546 A1 | 2/2009 | Kirsch | |
| 2013/0007210 A1 * | 1/2013 | Mass et al. | 709/217 |
| 2013/0031600 A1 * | 1/2013 | Luna et al. | 726/1 |

OTHER PUBLICATIONS

"Sana Security: Online Identity Protection", retrieved from http://www.sanasecurity.com on Feb. 2, 2009; Copyright 2007, 1 page.
"Third Brigade: Server & Application Protection For Dynamic Datacenters", retrieved from http://thirdbrigade.com on Feb. 2, 2009; Copyright 2009, 2 pages.
"Botnet", retrieved from Wikipedia http://en.wikipedia.org/wiki/Botnet on Feb. 2, 2009; last modified on Jan. 25, 2009; 6 pages.
"Damballa: Targeted Protection Against Targeted Attacks", retrieved from http://www.damballa.com on Feb. 2, 2009, 2 pages.

* cited by examiner

*Primary Examiner* — Jude Jean Gilles
(74) *Attorney, Agent, or Firm* — Barnes & Thornburg LLP (57) ABSTRACT

A method and system for detecting and reducing botnet activity includes tracking the number of connections to a destination address over predetermined periods of time. A persistence value is assigned to the destination address based on the number of time periods during which the destination address was connected. The persistence value is compared to a threshold value and an alert is generated if the persistence value is greater than the threshold value. Known safe destinations may be entered into a whitelist.

20 Claims, 5 Drawing Sheets

METHOD AND SYSTEM FOR DETECTING AND REDUCING BOTNET ACTIVITY

CROSS-REFERENCE TO RELATED U.S. PATENT APPLICATION

This application is a continuation application of U.S. application Ser. No. 12/347,169 entitled "METHOD AND SYSTEM FOR DETECTING AND REDUCING BOTNET ACTIVITY," which was filed on Dec. 31, 2008.

BACKGROUND

A botnet is a large collection of compromised computers controlled by a command structure including a master computer operated by an individual or group of individuals commonly known as a bot-master or a bot-herder. The command structure may also include additional computers, commonly known as command and control servers, for disseminating instructions from the bot-master. The compromised computers in the botnet, commonly known as drones or zombies, are used by the botnet command structure to stage various malicious and/or illegal activities including, for example, sending SPAM, launching denial-of-service attacks, scanning networks for vulnerability, stealing information, propagating computer viruses, and the like.

In order to receive updated or current instructions, compromised computer drones typically contact the command and control servers to receive instructions from the bot-master. The traffic associated with such communication is low in volume and can be difficult to distinguish from normal, good traffic emanating from the compromised computer.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
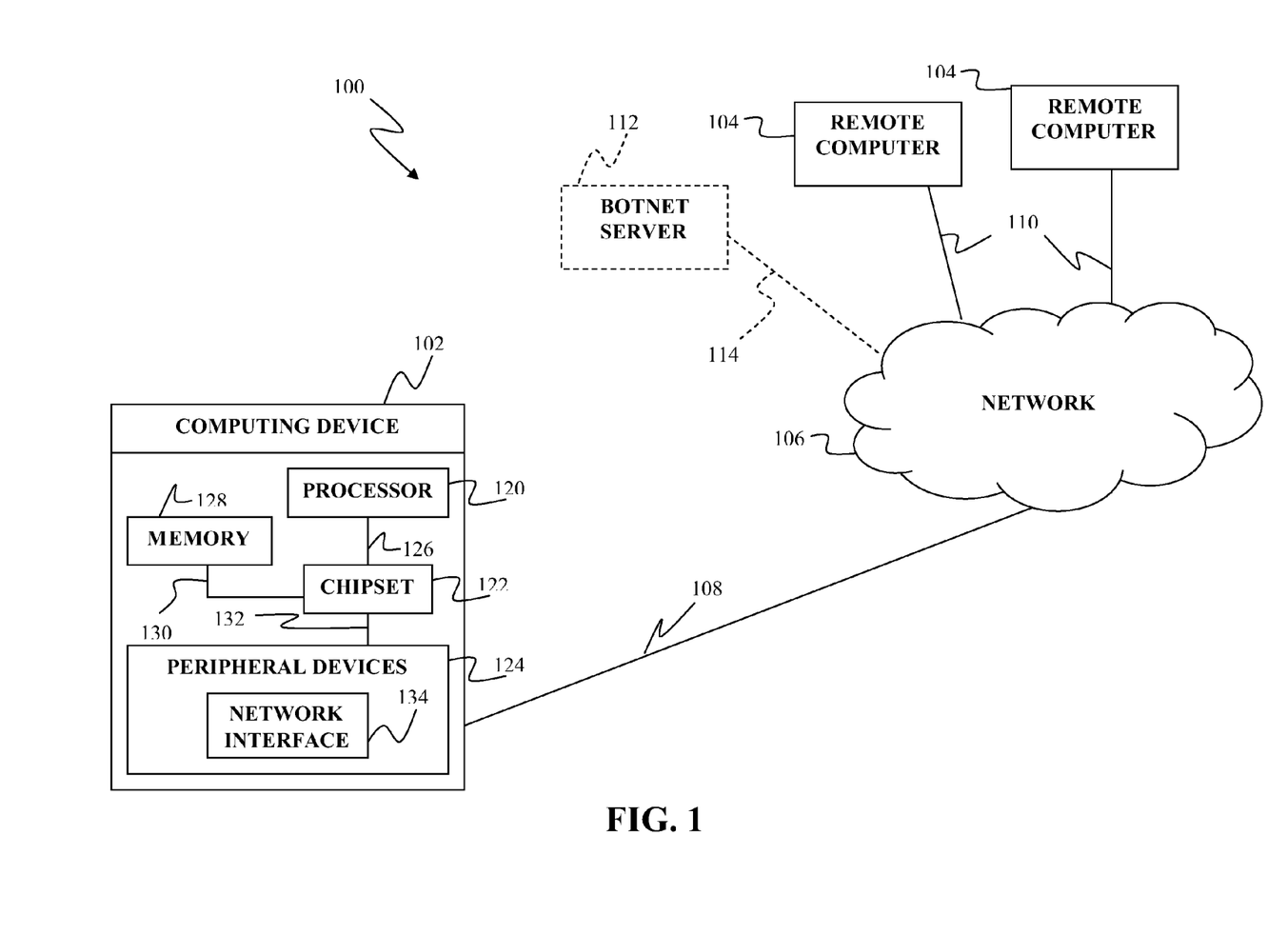
FIG. 1 is a simplified diagram of one embodiment of a computer network system.

Referring now to FIG. 1, a computer network system 100 includes a computing device 102, a plurality of remote computers 104, and a network 106. The computing device 102 may communicate with any one of the remote computers 104 over the network 106. The computing device 102 is communicatively coupled to the network 106 via a communication link 108. Similarly, the remote computers 104 are communicatively coupled to the network 106 via communication links 110. The communication links 108, 110 may be embodied as any type and number of communication links capable of facilitating communication between the computers 102, 104 and the network 106. For example, the communication links 108, 110 may be embodied as or otherwise include any number of wires, cables, wireless connections, and/or other interconnect. The network 106 may be embodied as or otherwise include any type of network including a local area network (LAN), a wide area network (WAN), or a publicly-accessible, global network such as the Internet. Additionally, the network 106 may include any number of intervening communication links and devices such as routers, switches, hubs, and other intervening computers.

If a botnet is active in the computer network system 100, the system 100 may also include one or more botnet servers 112. The botnet servers 112 are communicatively coupled to the network 106 via communication links 114, which may be similar to the communication links 108, 110. The botnet server 112 may be embodied as a botnet master, a botnet command and control server, or a previously compromised remote computer. As such, the destination address of the botnet server 112 is considered an unsafe destination address. However, the destination addresses of the remote computers 104 may be considered safe destination addresses.

In the illustrative embodiment of FIG. 1, the computing device 102 includes a processor 120, a chipset 122, and a plurality of peripheral devices 124. The computing device 102 may be embodied as any type of computing device such as, for example, a desktop computer system, a laptop computer system, or a handheld computing device. The illustrative processor 120 is a single core processor. However, in other embodiments, the processor 120 may be embodied as a multi-processor having any number of processor cores. Additionally, the client computer 102 may include additional processors having one or more processor cores.

The processor 120 is communicatively coupled to the chipset 122 via a number of signal paths 126. The signal paths 126 may be embodied as any type of signal paths capable of facilitating communication between the processor 120 and the chipset 122. For example, the signal paths 126 may be embodied as any number of wires, printed circuit board traces, via, bus, intervening devices, and/or the like. The chipset 122 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information.

The chipset 122 is communicatively coupled to a memory device 128 via a number of signal paths 130. Similar to the signal paths 126, the signal paths 130 may be embodied as any type of signal paths capable of facilitating communication between the chipset 122 and the memory device 128 such as, for example, any number of wires, printed circuit board traces, via, bus, intervening devices, and/or the like. The memory devices 128 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the client computer 102 may include additional memory devices.

The chipset 122 is also communicatively coupled to the plurality of peripheral devices 124 via signal paths 132. Again, similar to the signal paths 126, 130, the signal paths 132 may be embodied as any type of signal paths capable of facilitating communication between the chipset 122 and the peripheral devices 124 such as, for example, any number of wires, printed circuit board traces, via, bus, intervening devices, and/or the like. The peripheral devices 124 may include any number of peripheral devices including data storage devices, interfaces, and output devices. For example, as illustrated in FIG. 1, the peripheral devices may include a network interface 134 configured to facilitate communication between the client computer 102 and the network 106. Additionally, the peripheral devices 124 may include any number of other devices such as, for example, a keyboard, a display, a hard disk, a mouse, and/or the like. The particular devices included in the peripheral devices 124 may depend upon, for example, the intended use of the computing device. Further, it should be appreciated that the client computer 102 may include other components, sub-components, and devices not illustrated in FIG. 1 for clarity of the description.

Figure 2:
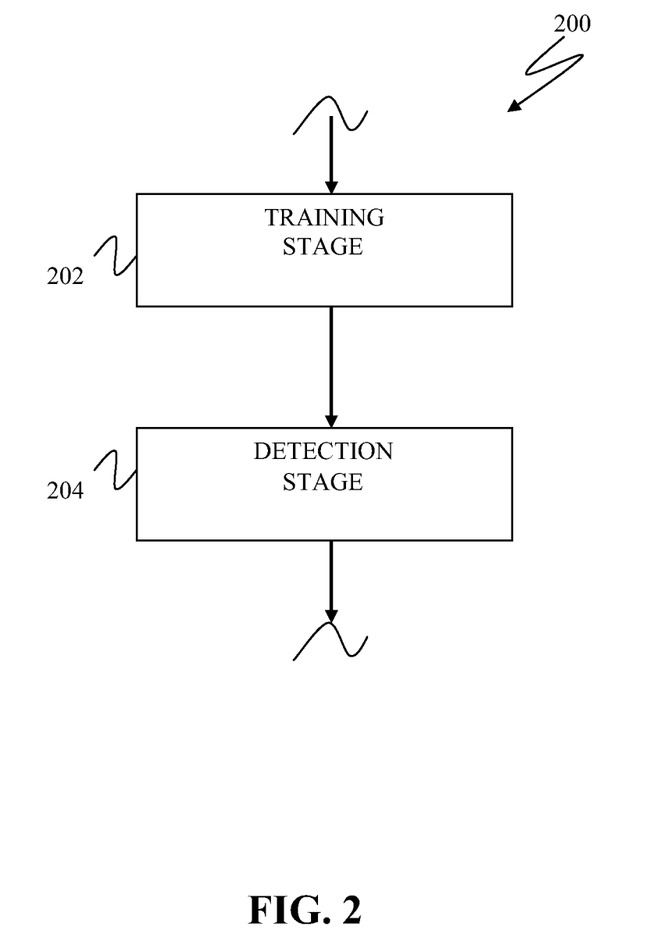
FIG. 2 is a simplified flow diagram of one embodiment of a method for detecting and reducing botnet activity.

Referring now to FIG. 2, a method 200 for detecting and reducing botnet activity may be executed by the computing device 102. The method 200 begins with block 202 in which a training stage is performed by the computing device 102. Once the training stage is complete, the computing device 102 performs a detection stage in block 204.

Figure 3:
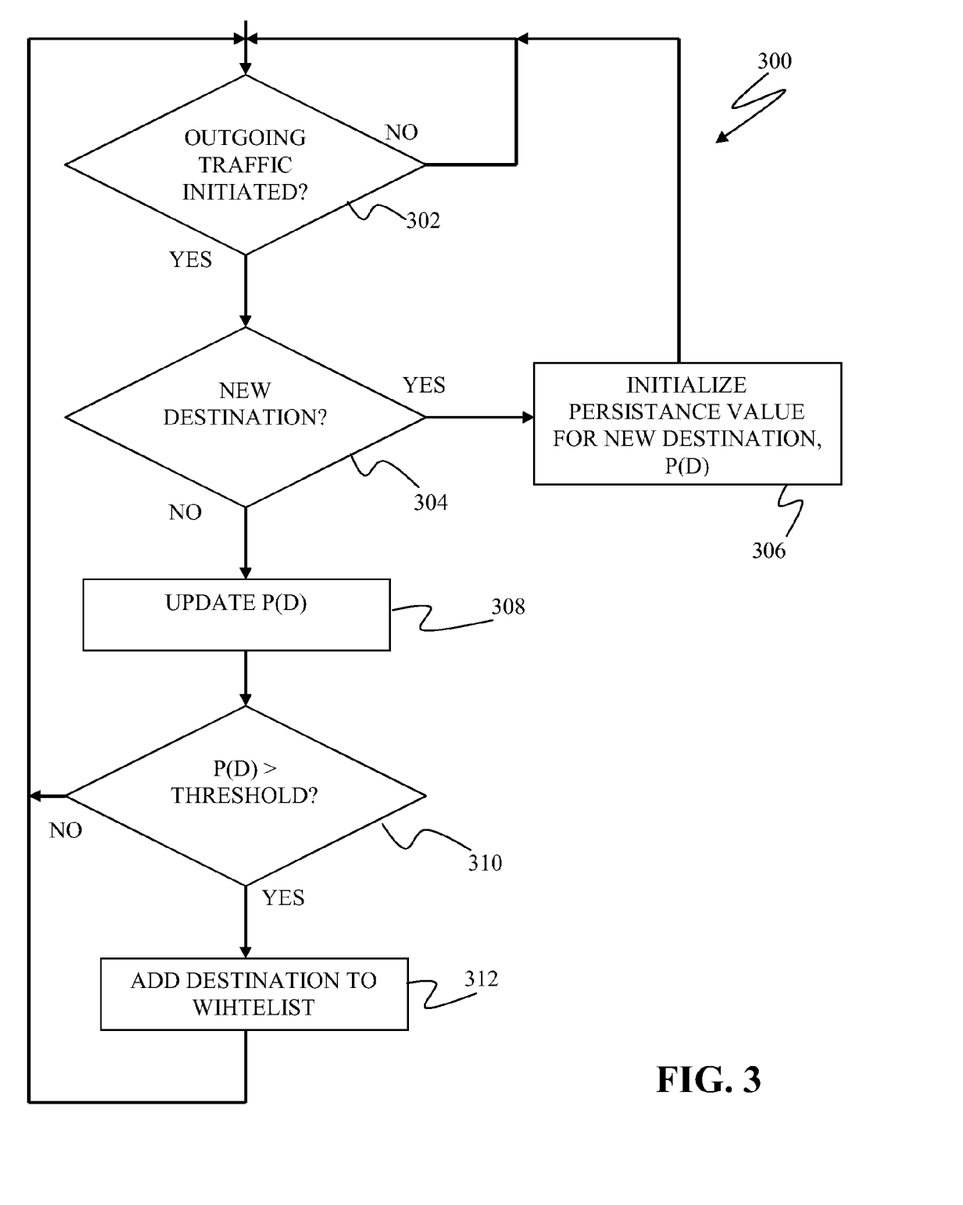
FIG. 3 is a simplified flow diagram of one embodiment of a method for training a computing device for detecting and reducing botnet activity.

One embodiment of a method 300 for performing the training stage of method 200 is illustrated in FIG. 3. The method 300 begins with block 302 in which the computing device 102 determines whether any outgoing traffic has been initiated. The outgoing traffic may be initiated by a request from a user of the computing device 102. For example, the user may navigate to a particular web site. If outgoing traffic has been initiated, the computing device 102 determines whether the destination is a new destination in block 304. To do so, the computing device 102 may analyze the destination address of the requested destination and compare the destination address to a list of previously identified destination addresses. The destination addresses may be embodied as any type of address that identifies a specific remote computer. For example, in one embodiment, the destination addresses are embodied as Internet Protocol (IP) addresses. However, in other embodiments the destination address may be embodied as Uniform Resource Locators (URLs) or the like.

If the requested destination is determined to be a new destination, a persistence value, $p(d)$, for the new destination, $d$, is initialized in block 306. The persistence value is indicative of how often a particular destination is connected to or otherwise requested for a given time period. For example, in one embodiment, the persistence value for a particular destination is defined as the ratio of the number of time periods during which the computing device 102 connected to or otherwise requested connection to the particular destination over the total number of time periods being monitored. Such time periods define separate tracking windows. Each tracking window corresponds to a period of time during which connection to the destination address is monitored. The collection of tracking windows define an observation window, which corresponds to the period of time over which the persistence value is determined.

For example, in one embodiment, the observation window may be set to a value of twenty-four hours. That is, the observation window corresponds to a period of time equal to twenty-four hours. As discussed above, the observation window is formed from a number of smaller tracking windows, each of which correspond to an equal period of time. For example, the tracking windows may be set to a value of two hours. That is, each tracking window corresponds to a period of time equal to two hours. As such, the observation window of twenty-four hours includes twelve separate tracking windows of two hours each. In such embodiments, the persistence value for a particular destination would be equal to the number of tracking windows in which the particular destination was connected to over the total number of tracking windows in the particular observation window. For example, if the particular destination was connected to or otherwise requested at least once in two of the tracking windows, the current persistence value, $p(d)$, for the current observation window would be equal to $2/12$ or about 0.167. In some embodiments, the observation window is a sliding window. That is, for every new tracking window (i.e., period of time) entered into, the oldest tracking window is discarded.

It should be appreciated that the accuracy of the detection method may be increased by using multiple observation windows. In such embodiments, the observation windows are equal to different periods of time. Each observation window may include a different number of tracking windows equal to different periods of time relative to other observation windows. By using multiple observation windows of varying sizes, the overall granularity of observation is increased thereby increasing the likelihood of detecting persistent communication with a particular destination. In embodiments wherein multiple observation windows are used, the persistence value for the destination may be equal to a weighted combination of the determined persistence values of the set of observation windows. For example, in some embodiments, the persistence value for the destination may be equal to the average persistence value of the set of observation windows. Alternatively, in other embodiments, the persistence value of particular observation windows (e.g., windows that have been determined to be significant in some way) may be weighted greater than other observation windows in the calculation of the overall persistence value of the destination. Additionally, in one particular embodiment, the persistence value for the destination is equal to the highest persistence value of the set of observation windows.

Referring back to the method 300, the persistence value, p(d), for each observation window is initialized in block 306. The particular number of observation windows, length of such windows, and number and length of associated tracking windows may be predetermined and stored in the computer device 102. If so, such data is subsequently retrieved from storage when required. In the illustrative embodiment, the observation windows and tracking windows are the same for each destination address. However, in other embodiments, the number and size of the observation windows and tracking windows may be randomly determined or determined based on some criteria such as the destination address itself. Additionally, it should be appreciated that, in some embodiments, the number of observation windows, length of such windows, and/or number and length of associated tracking windows may be adjusted "on the fly" or over time based on conditions of the computing environment, historical performance, user behavior, and/or other criteria. For example, in some embodiments, the number of observation windows, length of such windows, and/or number and length of associated tracking windows may be adjusted based on the conceived threat level. That is, when the threat level is determined to be high, more observation windows may be used.

Referring now back to block 304, if the destination is not new, the persistence value for the requested destination is updated in block 308. That is, the persistence value associated with each observation window is updated in block 308. To do so, the numerator of the persistence value is increased by one if the computing device 102 has not yet connected to the particular destination in the current tracking window of each observation window. As such, the persistence values associated with some observation windows may change while the persistence values associated with other observation windows remain the same depending on the length of the tracking windows associated with each observation window.

In block 310, the computing device 102 determines if the persistence value for the requested destination is greater than a threshold value. As discussed above, the persistence value for the requested destination is equal to the greatest persistence value of the set of observation windows being used. The threshold value may be predetermined and stored in the computing device 102. A lesser threshold value corresponds to greater security and a greater threshold value corresponds to lesser security. In one embodiment, the threshold value is a value in the range of about 0.5 to about 0.7. In one particular embodiment, the threshold value is about 0.6.

If the current persistence value for the requested destination is less than the threshold value, the method 300 loops back to block 302. However, if the current persistence value is greater than the threshold value, the requested destination address is added to a whitelist. The whitelist is embodied as a list of known safe destination addresses. Because the computing device 102 is in the training stage, any destination that is continually connected to is deemed to be a safe destination that is regularly visited. For example, the destination may correspond to a news site, a business site, or a community site. After the requested destination has been added to the whitelist, the method 300 loops back to the block 302.

Figure 4A:
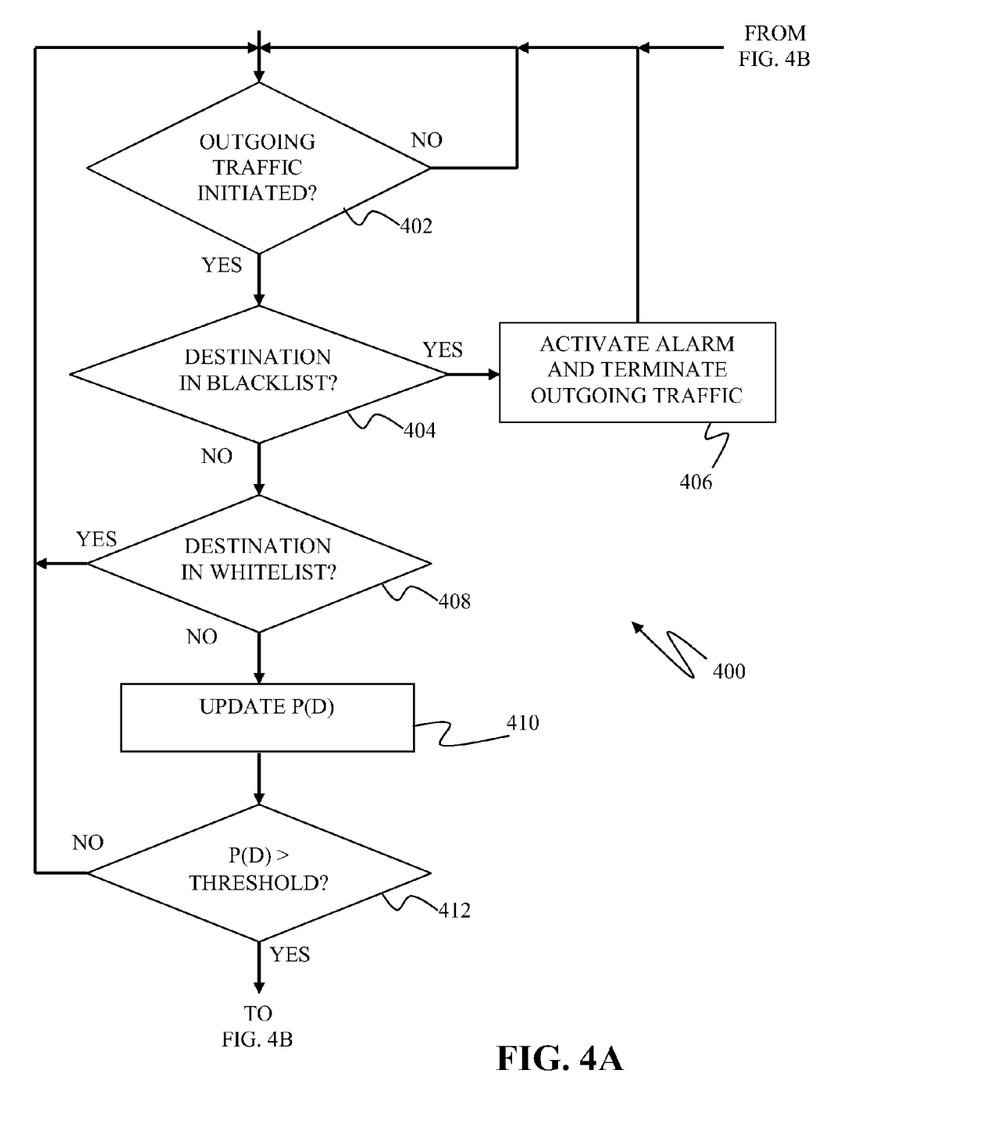
FIG. 4 is a simplified flow diagram of one embodiment of a method for detecting botnet activity.
Figure 4B:
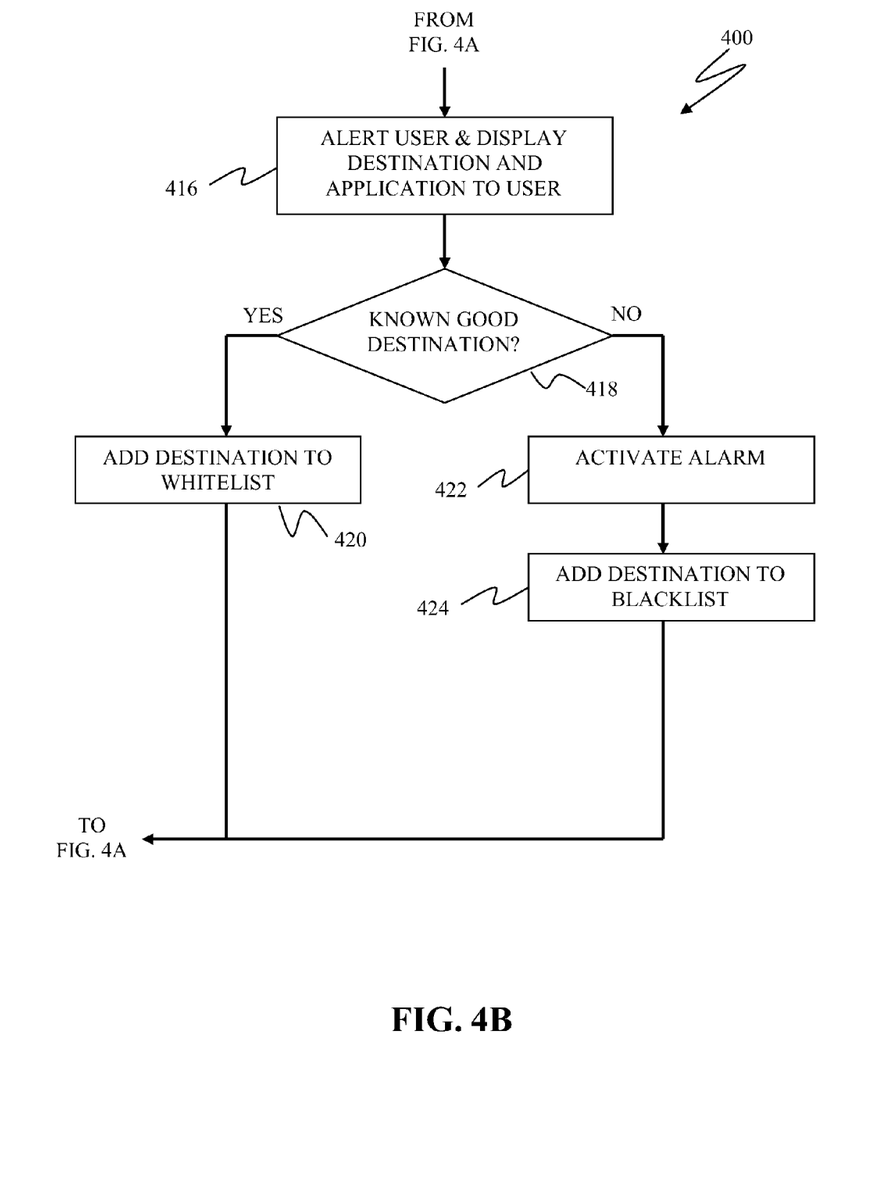

Referring back to FIG. 2, once the training stage is complete, the computing device 102 performs a detection stage in block 204. One embodiment of a method 400 for performing the training stage of method 200 is illustrated in FIGS. 4a and 4b. The method 400 begins with block 402 in which the computing device 102 determines whether any outgoing traffic has been initiated. As discussed above, the outgoing traffic may be initiated by any one or more background processes being executed on the computing device 102, by a request from a user of the computing device 102, and/or the like. If outgoing traffic has been initiated, the computing device 102 determines whether the destination is listed in a blacklist The blacklist corresponds to a list of known unsafe destination addresses. For example, the destination address contained in the blacklist may be destinations that have previously been identified as part of a botnet. If the requested destination is listed in the blacklist, an alarm is activated on the computing device 102 and the outgoing traffic is terminated in block 406. The alarm may be an audible and/or a visual alarm. For example, in one embodiment, a pop-up window is displayed to the user to inform that the destination address has been blacklisted and identified as harmful.

If, however, the requested destination is not listed in the blacklist, the computing device 102 determines whether the requested destination is in the whitelist in block 408. If so, the method 400 loops back to block 402. However, if the requested destination is not in the whitelist, the persistence value for the requested destination is updated in block 410. As discussed above, if multiple observation windows are used, the persistence value associated with each observation window is updated in block 410.

In block 412, the computing device 102 determines if the persistence value for the requested destination is greater than the threshold value. If a single observation window is being used, the persistence value for the required destination is equal to the persistence value of the single observation window. However, if multiple observation windows are being used, the persistence value may be equal to a weighted combination of the persistence values of the set of observation windows. For example, as discussed above, the persistence value for the destination may be equal to the average persistence value of the set of observation windows (some of which may be weighted differently from others), to the maximum persistence value of the set of observation windows, or to some other value calculated based on the persistence values of the multiple observation windows. Regardless, if the persistence value for the requested destination is less than the threshold value, the method 400 loops back to the block 402.

However, if the current persistence value of the destination is greater than the threshold value, an alert is generated in block 416. The alert may be an audible and/or a visual alarm. For example, in one embodiment a pop-up window is displayed to the user. The requested destination and the application requesting the destination is displayed in the pop-up window. In block 418, the user is prompted to determine whether the requested destination is a known safe destination. By reviewing the displayed destination and requesting application, the user may determine such information. If the user determines the requested destination is a known safe destination, the destination is added to the whitelist in block 420. However, if the requested destination is not a known safe destination, an alarm is activated in block 422 and the destination is added to the blacklist in block 424. The method 400 subsequently loops back to block 402.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. One or more machine-readable storage media comprising a plurality of instructions that, in response to being executed, cause a computing device to:
   compare a destination address that identifies a remote computer to a list of known safe destination addresses stored on a computing device;
   determine a first time length of a first observation window and a second time length of a second observation window, wherein each of the first and second observation windows includes a plurality of tracking windows of a third time length; and
   update a persistence value associated with the destination address if the destination address does not match an entry in the list of known safe destinations, wherein the persistence value is dependent on (i) a first ratio of the number of tracking windows of the first observation window during which the computing device connected to the destination address at least once over the total number of tracking windows in the first observation window and (ii) a second ratio of the number of tracking windows of the second observation window during which the computing device connected to the destination address at least once over the total number of tracking windows in the second observation window.

2. The machine-readable storage media of claim 1, wherein to determine the second time length comprises to determine a second time length of the second observation window that is different from the first time length.

3. The machine-readable storage media of claim 1, wherein to determine the second time length of the second observation window comprises to determine a second observation window including a number of tracking windows different from the first observation window.

4. The machine-readable storage media of claim 1, wherein the persistence value is equal to an average of the first ratio and the second ratio.

5. The machine-readable storage media of claim 1, wherein the persistence value is equal to the greater of the first ratio and the second ratio.

6. The machine-readable storage media of claim 1, wherein the plurality of instructions further cause the computing device to apply a weighting factor to at least one of the first ratio and the second ratio.

7. The machine-readable storage media of claim 1, wherein the first time length and the second time length are randomly determined.

8. The machine-readable storage media of claim 1, wherein the plurality of instructions further cause the computing device to compare the persistence value to a predetermined threshold value and generate an alert if the persistence value is greater than the predetermined threshold value.

9. The machine-readable storage media of claim 6, wherein to generate the alert comprises to prompt a user of the computer device to determine whether the destination address is a safe destination address and update the list of known safe destination address with the destination address in response to the user identifying the destination address as a safe destination address.

10. A computing device comprising:
    a processor; and
    a memory device having stored therein a plurality of instructions, which when executed by the processor, result in the computing device:
    comparing a destination address identifying a remote computer to a list of known safe destination addresses stored on a computing device;
    determining a length of a first time period, a length of a second time period, a length of a third time period, and a length of a fourth time period, wherein (i) the first time period includes a plurality of the second time periods and (ii) the third time period including a plurality of the fourth time periods;
    calculating a first persistence value and a second persistence value associated with the destination address if the destination address does not match an entry in the list of known safe destinations, wherein (i) the first persistence value is equal to a ratio of the number of second time periods during which the computing device connected to the destination address at least once over the total number of second time periods of the first time period and (ii) the second persistence value is equal to a ratio of the number of fourth time periods during which the computing device connected to the destination address at least once over the total number of fourth time periods of the third time period;
    updating a final persistence value for the destination address based on the first and second persistence value; and
    generating an alert if the final persistence value is greater than a threshold value.

11. The computing device of claim 10, wherein the length of the first time period is different from the length second time period.

12. The computing device of claim 11, wherein the length of the second time period is different from the length of the fourth time period.

13. The computing device of claim 10, wherein determining the length of the first time period, the length of the second time period, the length of the third time period, and the length of the fourth time period comprises randomly determining a length of the first time period, a length of the second time period, a length of the third time period, and a length of the fourth time period.

14. The computing device of claim 10, wherein calculating the final persistence value comprises averaging the first and second persistence values.

15. The computing device of claim 10, wherein calculating the final persistence value comprises setting the final persistence value equal to the greater of the first and second persistence values.

16. The computing device of claim 10, wherein calculating the final persistence value comprises applying a weighting factor to at least one of the first and second persistence values.

17. One or more machine-readable storage media comprising a plurality of instructions that, in response to being executed, cause a computing device to:

compare a destination address of a remote computer to a list of known safe destination addresses stored on a computing device; and update a persistence value associated with the destination address if the destination address does not match an entry in the list of known safe destinations, wherein the persistence value is indicative of the regularity at which the computing device communicates with the remote computer identified by the destination address.

18. The machine-readable storage media of claim 17, wherein the plurality of instructions further cause the computing device to calculate a first persistence value and a second persistence value associated with the destination address if the destination address does not match an entry in the list of known safe destinations, wherein (i) the first persistence value is indicative of the regularity at which the computing device communicates with the remote computer identified by the destination address during a first time period and (ii) the second persistence value is indicative of the regularity at which the computing device communicates with the remote computer identified by the destination address during a second time period, and wherein to update the persistence value comprises to update a final persistence value associated with the destination address based on the first persistence value and the second persistence value.

19. The machine-readable storage media of claim 18, wherein to update the final persistence value comprises to average the first and second persistence values.

20. The machine-readable storage media of claim 18, wherein to update the final persistence value comprises to set the final persistence value equal to the greater of the first and second persistence values.

* * * * *